July 23, 1968

D. M. OVIATT 3,393,559

RAIN GAUGE

Filed Feb. 6, 1967

INVENTOR.
DEAN M. OVIATT
BY
William G. Gapczynski
ATTORNEY

July 23, 1968   D. M. OVIATT   3,393,559
RAIN GAUGE
Filed Feb. 6, 1967   2 Sheets-Sheet 2

INVENTOR.
DEAN M. OVIATT
BY
*William G. Gapczynski*
ATTORNEY

United States Patent Office 3,393,559
Patented July 23, 1968

3,393,559
RAIN GAUGE
Dean M. Oviatt, Los Angeles, Calif.
(12316 Braddock Drive, Culver City, Calif. 90230)
Filed Feb. 6, 1967, Ser. No. 614,348
6 Claims. (Cl. 73—171)

ABSTRACT OF THE DISCLOSURE

This invention relates to an improved rain gauge, wherein the gauge has the ability to record and transmit level variations in addition to operating unattended for extended periods of time. Cam operated switches control the water level of the gauge through a relay and solenoid valve circuit.

---

The invention described herein may be manufactured and used by or for the Government for governmental purposes without the payment to me of any royalty thereon.

Background of the invention

The present invention enables the obtaining of rainfall data from areas that are inaccessible for long periods of time or where people are unavailable to service the rainfall equipment at weekly or monthly intervals. As a result, rainfall data heretofore unavailable or economically unfeasible, is now available.

Description of the preferred embodiments

Figure 2:
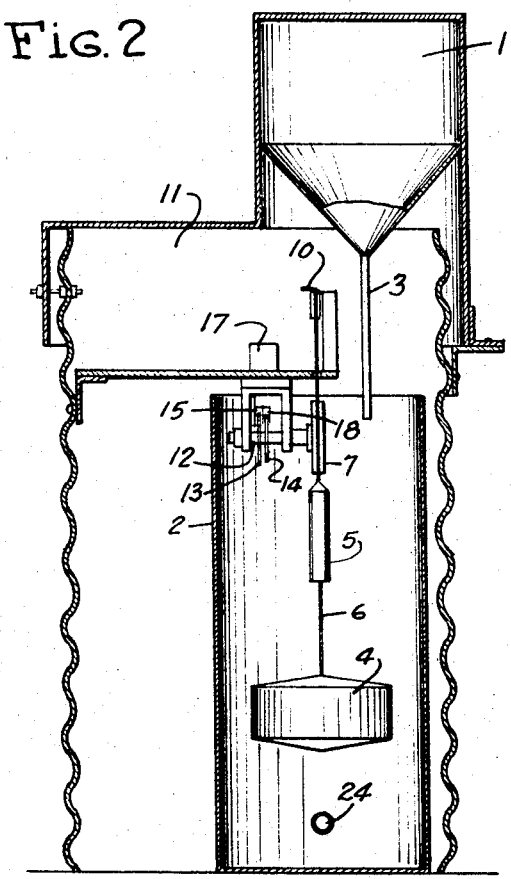
FIG. 2 is a cut-away view of the rain gauge disclosing a cam operated switching mechanism and its positioning within the rain gauge.
Figure 1:
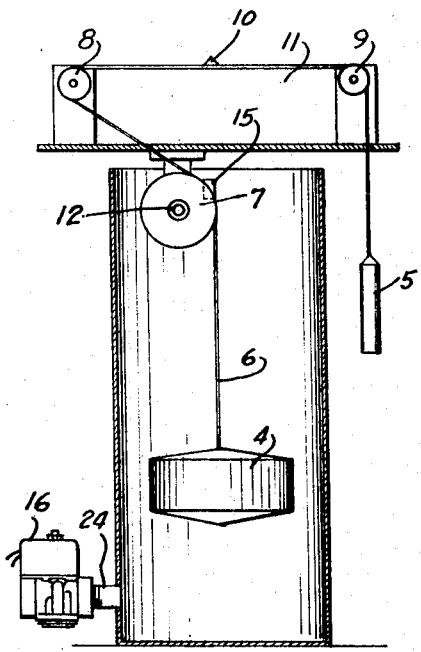
FIG. 1 is a cut-away view of the rain gauge disclosing the pulley system and a means for recording the water level variations.

Referring now more particularly to the drawings, in FIGS. 1 and 2, rain enters the rainfall collector 1 and is funneled into the storage tank 2 through tube 3. As the water level in the storage tank rises, float 4 rises, allowing the counter-weight 5 to lower by cable 6 moving over pulleys 7, 8, and 9. A pen 10, fastened to the cable, moves across the graduated chart on recorder 11 leaving a trace equal to the variations of the water level in the storage tank. As the cable moves, pulley 7 turns shaft 12 and cams 13 and 14. When cam 13 encounters switch 15, an electrical circuit is completed, opening solenoid valve 16, thus opening water outlet 24 in the tank. The solenoid valve is held open by relay 17, thereby allowing water to escape and thus lowering the water level within the storage tank. As the water level drops, pulley 7, shaft 12, and cams 13 and 14 turn clockwise until cam 14 contacts switch 18, thus opening the circuit. Activation of switch 18 closes the solenoid valve and releases the relay thus closing the water outlet of the tank. As the water level lowers, pen 10 moves across the graduated chart on recorder 11 and the components are ready to repeat the process. Thus, the rain gauge becomes self-sustaining as the storage tank capacity limitation is overcome as the tank becomes self emptying upon reaching the upper limit set by the cam relationships.

Figure 4:
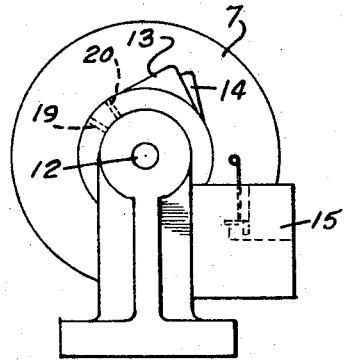
FIG. 4 is a side view of the cam operated switching mechanism of FIG. 3.
Figure 3:
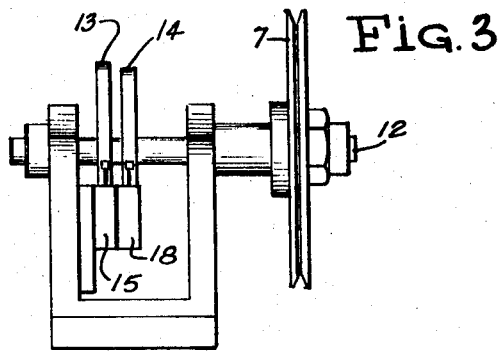
FIG. 3 is an enlarged view of the cam operated switching mechanism of FIG. 2.
Figure 8:
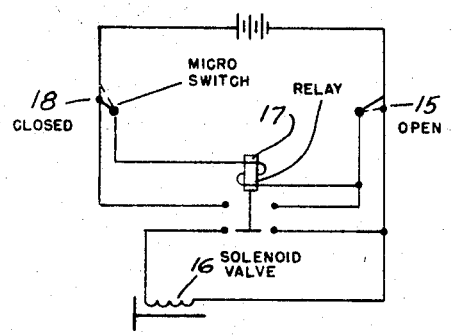
FIG. 8 is a wiring diagram of the water level control circuitry.
Figure 7:
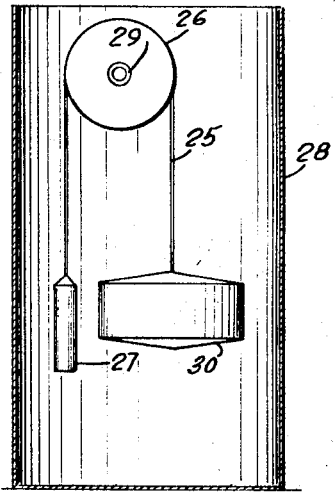
FIG. 7 is a modification of FIG. 1 in which the cam operated switching mechanism of FIGS. 5a, 5b, and 6 is employed and a graphic record of the water level is not needed at the station site.
Figure 5A:
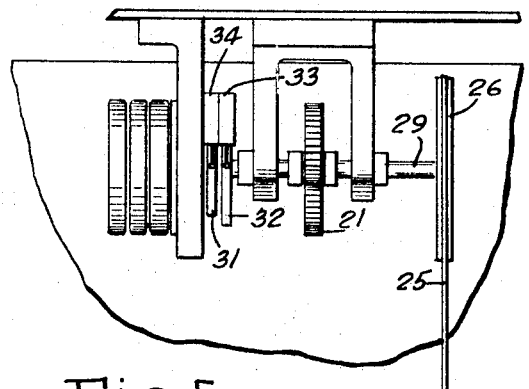
FIG. 5a is an alternative cam operated switching mechanism.
Figure 6:
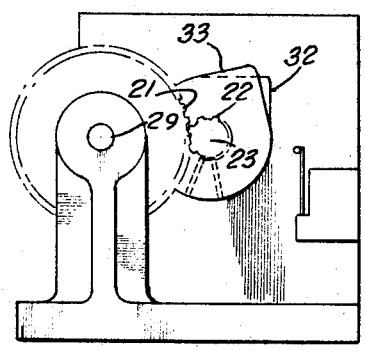
FIG. 6 is a side view of the cam operated switching mechanism of FIG. 5b.
Figure 5B:
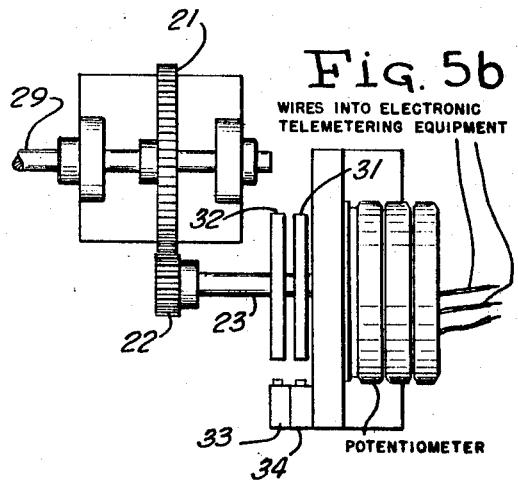
FIG. 5b is a top view of the cam operated switching mechanism of FIG. 5a isolated from the support housing.

Referring to FIGS. 3 and 4, the rotation of pulley 7 causes shaft 12 to rotate as well as cams 13 and 14. The outer terminal pitch of cam 13 is selectively spaced a desirable distance from that of the outer terminal pitch of cam 14. Set screws 20 and 19 respectively are used to hold the cams in their selected relationship. As shaft 12 rotates, counter-clockwise and then clockwise, cams 13 and 14 alternately come in contact with switches 15 and 18, respectively. Switches 15 and 18 control the activation of solenoid valve 16 and relay 17. In actual operation, cam 14, when in contact with switch 18, represents the lower water level limit of the tank. At this point solenoid 16 is de-energized and outlet 24 is closed. The water level is filled in this initial stage to the level at which float 4 permits cam 14 to remain in contact with switch 18. As water is then accumulated by tank 2, the float 4 rises and cams 13 and 14, FIG. 4, are rotated counter-clockwise to a point at which cam 13 is brought in contact with switch 15. Switch 15 activates the solenoid valve 16 and relay 17 thus allowing water to flow out of the tank through outlet 24. As the water level lowers, float 4 drops causing cams 13 and 14, FIG. 4, to rotate in a clockwise motion until cam 14 is brought in contact with switch 18, causing the de-energizing of solenoid 16 and relay 17 and thus closing outlet 24. The lower level point of operation within storage tank 2 is adjustable by positioning cam 14 on shaft 12 with set screw 19, FIG. 4. The span of operation may then be adjusted by positioning cam 13 on shaft 12 with set screw 20. Antifreeze may be substituted for water in the initial filling of the storage tank when it is anticipated that the rain gauge may come in contact with freezing temperatures.

FIGS. 5a, 5b, 6, and 7 represent an alternative embodiment of the invention. In this embodiment, a potentiometer and electronic telemetering equipment are used to record the water level variations in place of or in addition to pen 10 and recorder 11. Gear train 21–22 is also added. In operation, cable 25 passes over an enlarged pulley 26 and terminates at counterweight 27. The counterweight is contained within the water storage chamber 28. Pulley 26 is fastened to shaft 29 and causes shaft 29 to rotate when float 30 moves. Gear 21, also attached to shaft 29, is caused to move by the rotation of shaft 29. Gear 22 is meshed with gear 21. Shaft 23, which drives the potentiometer and thus the telemetering equipment and to which switching cams 31 and 32 are attached, has gear 22 fastened to it. Thus a variation in the water level of the tank is recorded by the telemetering equipment through force transmission train 30, 25, 26, 29, 21, 22, and 23. Shaft 29, gear 22, and shaft 23 are similar in diameter. Pulley 26 and gear 21 are also similar in diameter. As a result, the respective rotation gain of pulley 26 and shaft 29 is maintained with little alteration when translated by gear 21, gear 22, and shaft 23. The design criteria followed as to the size of pulley 26, shaft 29, gears 21 and 22, and shaft 23 is such that counterweight 27 is never to be immersed within the water retained within accumulation tank 28. The operation of switches 33 and 34 and the adjustability features of cams 31 and 32 are identical to switches 15 and 18 and cams 13 and 14 of the prior embodiment.

I claim:
1. A recording device for the recording of liquid levels comprising:
   (a) a liquid retaining enclosure;
   (b) float means within said enclosure movable with respect to the liquid level in the enclosure;
   (c) recording means responsive to the positioning of said float means;
   (d) liquid level control means responsive to the positioning of said float means;
   (e) a connector attached to said float means;
   (f) a counter-weight attached to the free end of said connector to maintain tension within said connector;
   (g) a pulley system over which said connector travels;
   (h) a rotatable shaft fastened to one of the pulleys of said pulley system;
   (i) a plurality of cams fastened to said rotatable shaft and adjustable as to positioning upon said shaft; and
   (j) switching means aligned with said cams and actuated by said cams for controlling said liquid level control means.

2. A recording device as described in claim 1 wherein the recording means comprises a pen attached to said connector.

3. A recording device for the recording of liquid levels as described in claim 2 wherein the liquid level control means is a solenoid valve controlled outlet.

4. A recording device for the recording of liquid levels comprising:
   (a) a liquid retaining enclosure;
   (b) float means within said enclosure movable with respect to the liquid level in the enclosure;
   (c) recording means responsive to the positioning of said float means;
   (d) liquid level control means responsive to the positioning of said float means;
   (e) a connector attached to said float means;
   (f) a counter-weight attached to the free end of said connector to maintain tension within said connector;
   (g) a pulley over which said connector travels;
   (h) a first rotatable shaft fastened to said pulley;
   (i) a gear transmission system driven by said first rotatable shaft;
   (j) a second rotatable shaft driven by said gear transmission system;
   (k) a plurality of cams fastened to said second rotatable shaft and adjustable as to positioning upon said shaft;
   (l) switching means aligned with said cams and actuated by said cams for controlling said liquid level control means; and
   (m) telemetering equipment driven by said second rotatable shaft for the recording of liquid level variations.

5. A recording device as described in claim 4 wherein the recording means comprises a pen attached to said connector.

6. A recording device for the recording of liquid levels as described in claim 4 wherein the liquid level control means is a solenoid valve controlled outlet.

References Cited
UNITED STATES PATENTS

| | | | |
|---|---|---|---|
| 200,443 | 2/1878 | Dunne et al. | 73—171 |
| 880,592 | 3/1908 | Sterling | 73—312 X |
| 2,735,298 | 2/1956 | Dispenza | 73—171 |

RICHARD B. WILKINSON, *Primary Examiner.*

JOSEPH W. HARTARY, *Assistant Examiner.*